United States Patent
Schoob et al.

(10) Patent No.: US 11,745,606 B2
(45) Date of Patent: Sep. 5, 2023

(54) METHOD AND DEVICE FOR AUTOMATICALLY CONNECTING A CHARGING CONNECTOR TO A CHARGING CONNECTOR SOCKET OF A VEHICLE,

(71) Applicants: AVATERAMEDICAL DIGITAL SOLUTIONS GMBH, Hannover (DE); KUKA AKTIENGESELLSCHAFT, Augsburg (DE)

(72) Inventors: Andreas Schoob, Hannover (DE); Simon Aden, Hannover (DE); Jens Kotlarski, Gehrden (DE); Norbert Settele, Petersdorf (DE)

(73) Assignees: MATTHIAS DAGEN, JENS KOTLARSKI, TOBIAS ORTMAIER FORWARDTTC IP HOLDING GBR; KUKA AKTIENGESELLSCHAFT

( * ) Notice: Subject to any disclaimer, the term of this patent is extended or adjusted under 35 U.S.C. 154(b) by 0 days.

(21) Appl. No.: 16/977,131

(22) PCT Filed: Feb. 27, 2019

(86) PCT No.: PCT/EP2019/054913
§ 371 (c)(1),
(2) Date: Sep. 1, 2020

(87) PCT Pub. No.: WO2019/166519
PCT Pub. Date: Sep. 6, 2019

(65) Prior Publication Data
US 2021/0001736 A1 Jan. 7, 2021

(30) Foreign Application Priority Data
Mar. 2, 2018 (DE) ..................... 10 2018 104 759.2

(51) Int. Cl.
*B60L 53/16* (2019.01)
*B60L 53/35* (2019.01)

(52) U.S. Cl.
CPC ............... *B60L 53/16* (2019.02); *B60L 53/35* (2019.02); *B60L 2250/22* (2013.01); *B60Y 2200/91* (2013.01)

(58) Field of Classification Search
CPC ...... B60L 53/16; B60L 53/35; B60L 2250/22; B60Y 2200/91
(Continued)

(56) References Cited

U.S. PATENT DOCUMENTS 7,999,506 B1    8/2011   Hollar et al.
8,169,186 B1 *  5/2012   Haddad .................. B60L 53/65
                                               320/109
(Continued)

FOREIGN PATENT DOCUMENTS

DE   102012014936 A1   1/2014
DE   102015213160 A1   1/2017
(Continued)

OTHER PUBLICATIONS

CarTV; "Volkswagen E-Smart Connect"; YouTube; Jul. 14, 2015; 1 pg.
(Continued)

*Primary Examiner* — Suresh Memula
(74) *Attorney, Agent, or Firm* — GARDNER GROFF & GREENWALD, PC

(57) ABSTRACT

The invention relates to a method for automatically connecting a charging connector (12) to a charging connector socket (21) of a vehicle (2), preferably a land vehicle (2), comprising at least the following steps:
first optical capturing (100) of the charging connector socket (21) and/or the vehicle (2) as a first image by
(Continued)

Figure 7:
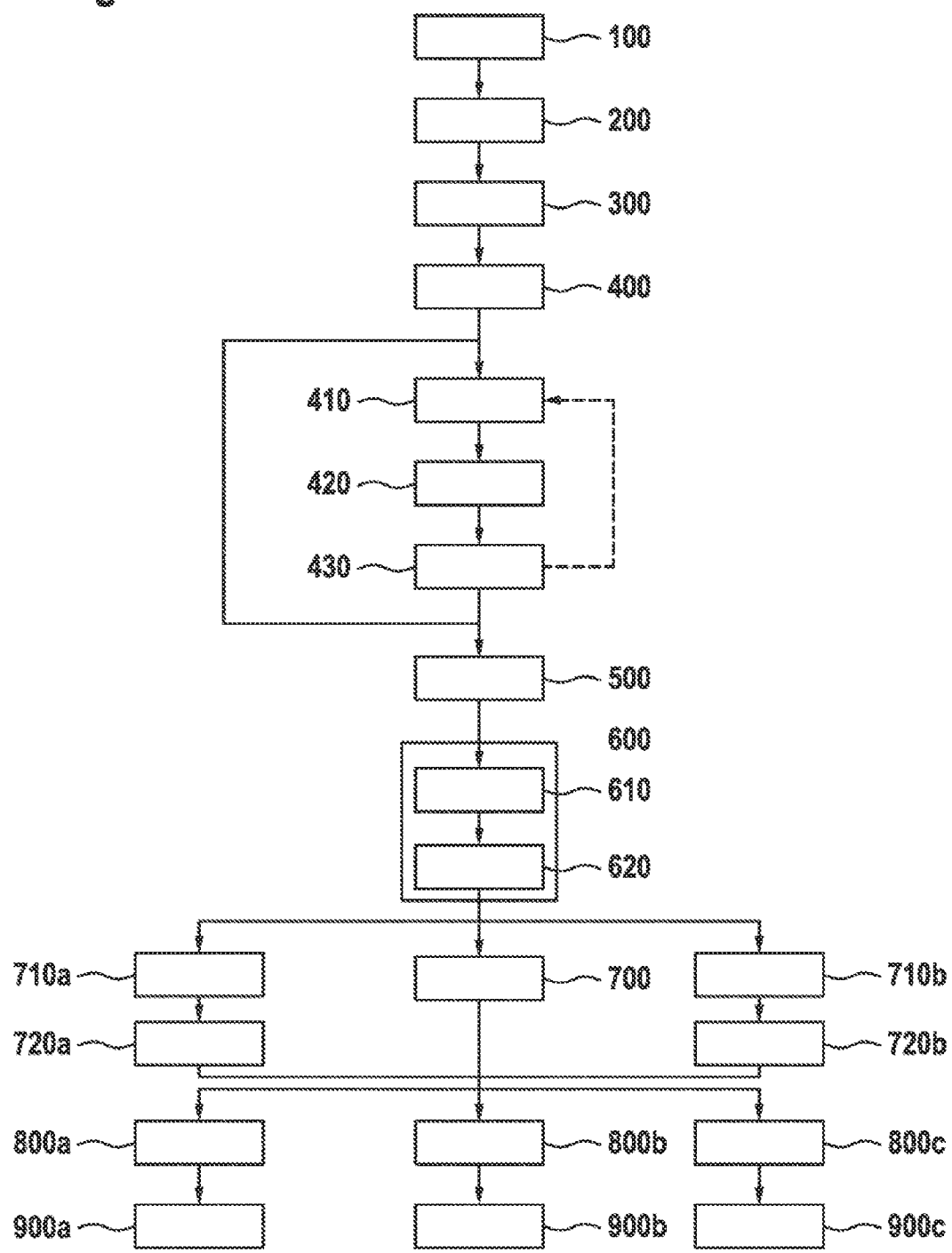

means of at least one first image capturing unit (13) which is arranged to be movable with the charging connector (12), determining (200) the position of the charging connector socket (21) and/or of the vehicle (2) based on the first image, reducing (300) the distance between the charging connector (12) and the charging connector socket (21) and/or the vehicle (2) by means of a positioning unit (10), and second optical capturing (400) of the charging connector socket (21) and/or of the vehicle (2) as a second image by means of the first image capturing unit (13).

19 Claims, 4 Drawing Sheets

(58) Field of Classification Search
USPC .......................................................... 320/109
See application file for complete search history.

(56) References Cited

U.S. PATENT DOCUMENTS

| | | | |
|---|---|---|---|
| 9,056,555 | B1 | 6/2015 | Zhou |
| 10,427,304 | B2 * | 10/2019 | Leary ...................... B25J 9/023 |
| 2011/0254504 | A1 * | 10/2011 | Haddad .................. B60L 53/65 |
| | | | 320/109 |
| 2013/0076902 | A1 * | 3/2013 | Gao ........................ B60L 53/31 |
| | | | 348/148 |
| 2015/0210174 | A1 | 7/2015 | Settele |
| 2017/0008411 | A1 | 1/2017 | Wu |
| 2018/0056801 | A1 | 3/2018 | Leary |
| 2019/0001831 | A1 | 1/2019 | Schutz et al. |
| 2019/0050697 | A1 * | 2/2019 | Meng ............... G06K 19/07749 |
| 2021/0008991 | A1 * | 1/2021 | Schütz .................... B60L 53/14 |
| 2021/0086643 | A1 * | 3/2021 | Satheesh Babu ....... B60L 53/14 |
| 2021/0142127 | A1 * | 5/2021 | Lee ...................... G06K 9/6262 |
| 2022/0194246 | A1 * | 6/2022 | Van Der Weijde ......................... |
| | | | B25J 17/0216 |

FOREIGN PATENT DOCUMENTS

| | | |
|---|---|---|
| DE | 102015225986 A1 | 6/2017 |
| DE | 102016004889 A1 | 10/2017 |
| DE | 102016207767 A1 | 11/2017 |
| FR | 3048386 A1 | 9/2017 |
| WO | WO-2018218306 A1 * 12/2018 ............. B60L 50/60 |
| WO | WO-2021167462 A2 * 8/2021 .......... B25J 17/0208 |

OTHER PUBLICATIONS

International Search Report for PCT/EP2019/054913; dated Apr. 15, 2019; 6 pgs.

Tesla; "Charger Prototype Finding Its Way to Model S"; YouTube; Aug. 6, 2015; 1 pg.

WillowGarageVideo's Channel; "Milestone 2 Explained"; YouTube; Jul. 2, 2009; 1 pg.

* cited by examiner

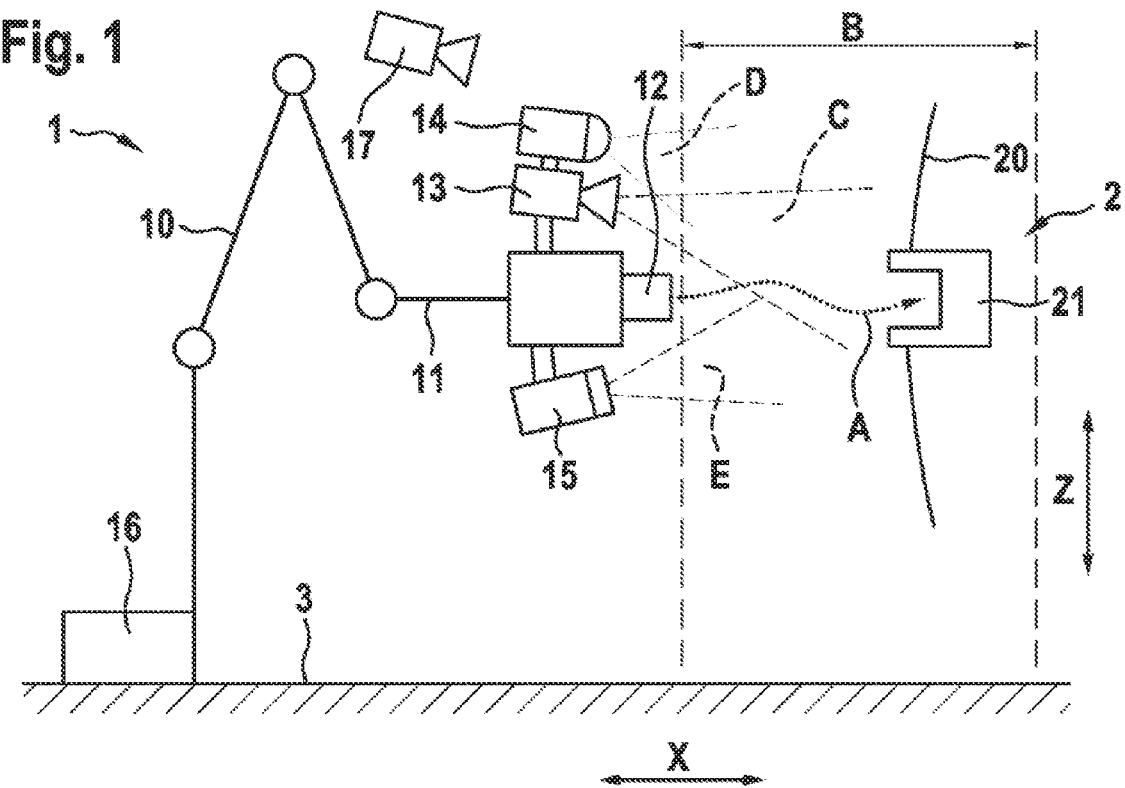
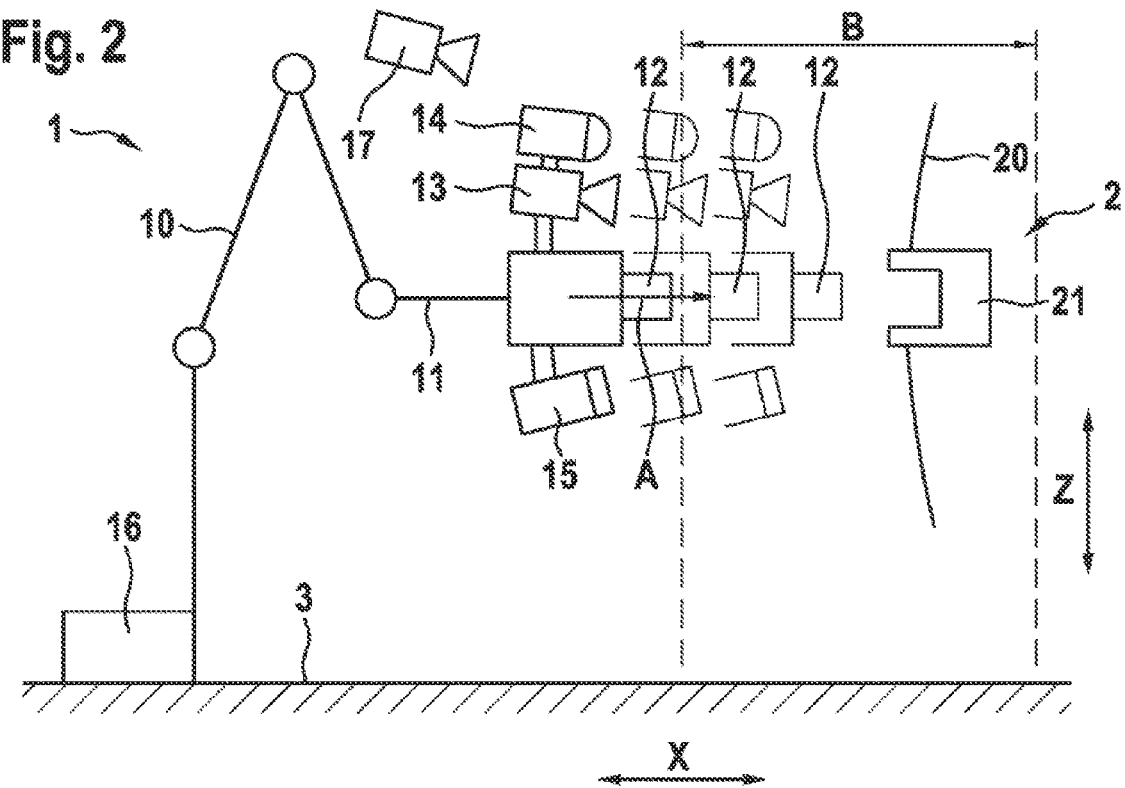

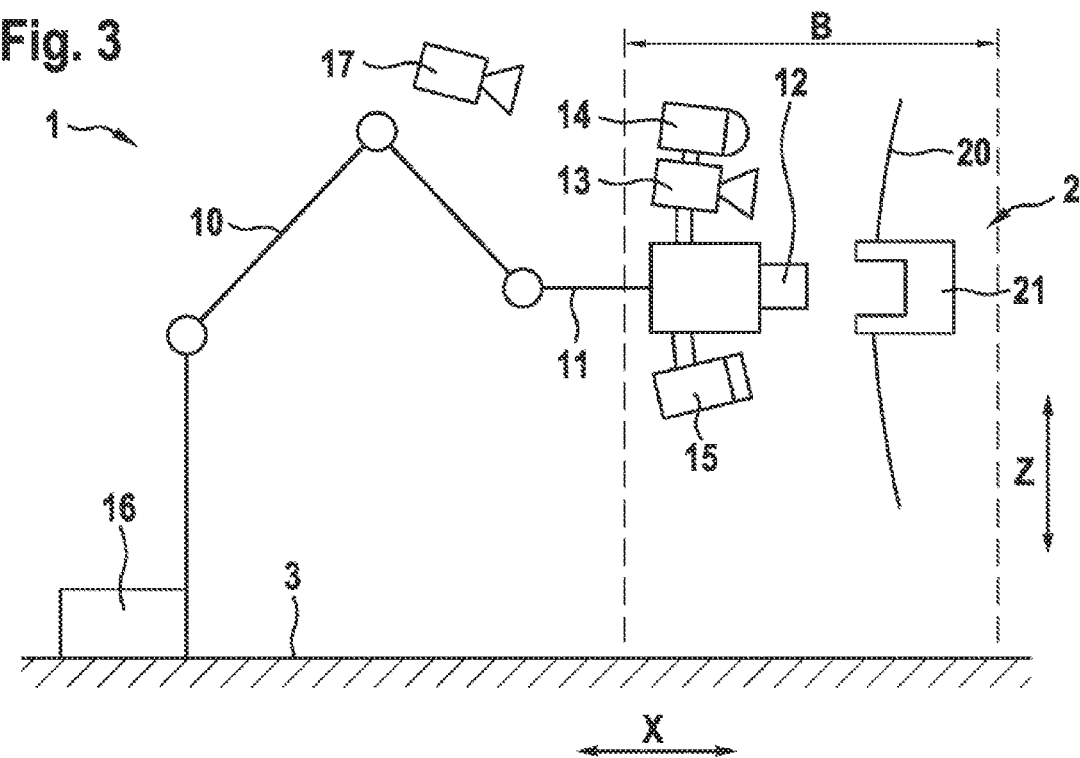
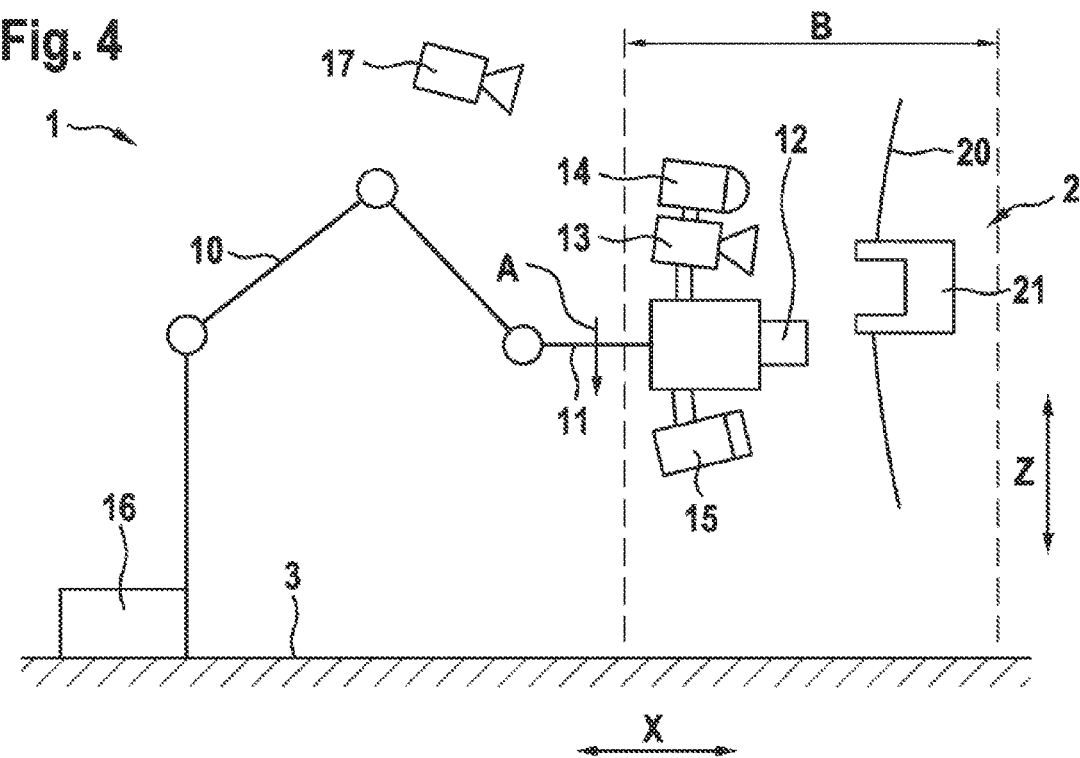

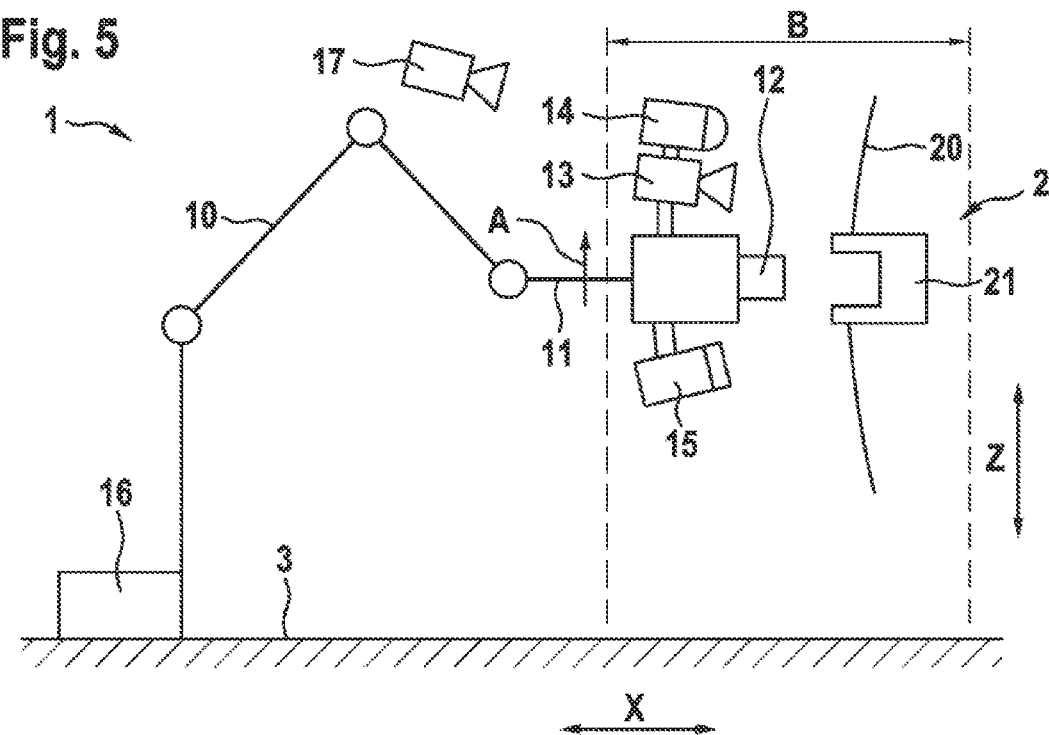
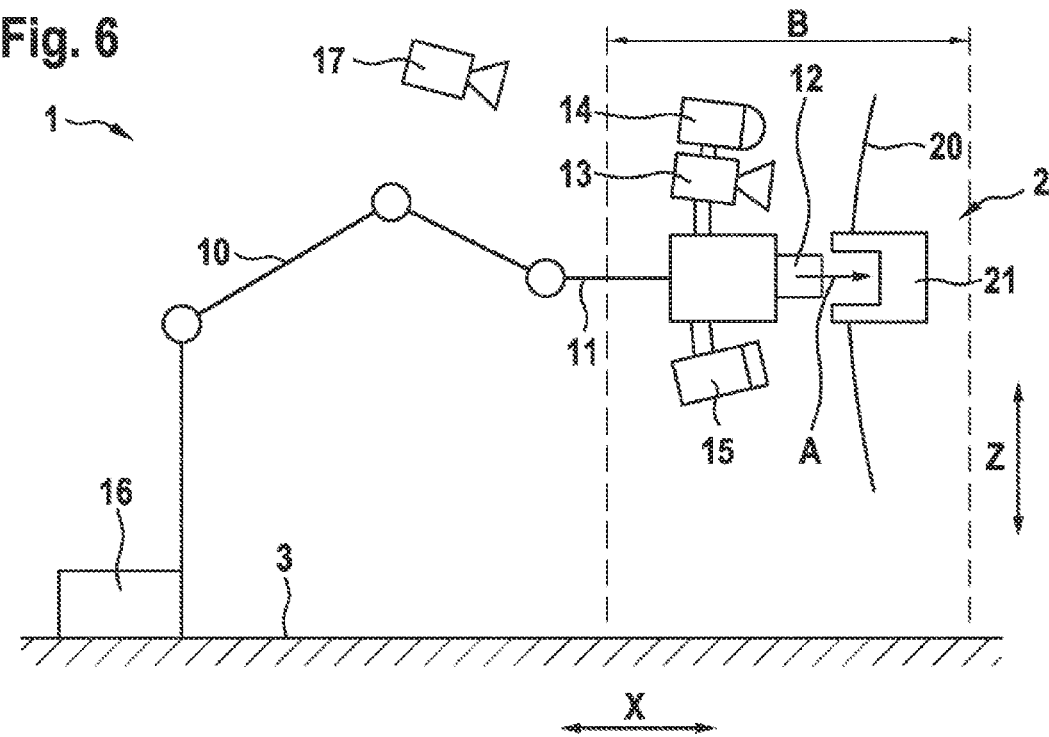

METHOD AND DEVICE FOR AUTOMATICALLY CONNECTING A CHARGING CONNECTOR TO A CHARGING CONNECTOR SOCKET OF A VEHICLE,

The present invention relates to a method for automatically connecting a charging connector to a charging connector socket of a vehicle, preferably a land vehicle, according to claim 1, a device for carrying out such a method according to claim 17 and a computer program product for carrying out such a method according to claim 18.

Vehicles have been used on land, water and in the air for a long time, for example to transport people and objects. While vehicles with internal combustion engines have prevailed up to now in most applications, vehicles have long been known whose drives are fully or partially fed with electrical energy. This also applies to land vehicles, in which golf carts, electric carts and electric forklifts, for example, have been used as electrically operated vehicles for special applications for a long time. For some years now, due to increasing environmental awareness, the trend in land vehicles has been moving more and more towards electrically powered vehicles, so that buses, trucks and passenger vehicles of this type are increasingly being developed to series production standards and are increasingly coming onto the market. Such vehicles are referred to as electric vehicles or hybrid electric vehicles, depending on the implementation of the electric drive or the supply of the electric drive.

In the case of electrically operated land vehicles such as buses, trucks and passenger cars, the limited range has so far been a major disadvantage. This essentially results from the weight, size and cost of the accumulators as rechargeable electrical energy stores. In order to increase the range of these vehicles, the capacity of the electrical storage must be increased. This leads to the use of even heavier, larger and more expensive accumulators.

In order to avoid this weight and, in particular, the increased costs, numerous land vehicles that may therefore be operated electrically are equipped with rechargeable electrical energy storage devices with a comparatively low capacity, which reduces their range, but may save weight, space and costs. So far, this may be more important for a customer's purchase decision than the range of the vehicle.

Conversely, it is therefore necessary to recharge the rechargeable electrical energy storage device as often as possible due to its comparatively low capacity in order to be able to start using the vehicle with as complete a charge as possible and thus with the maximum possible range. For this purpose, for example at home, during working hours or while shopping in a parking garage, the vehicle may be connected to an electric charging station located there overnight, in order to use any interruption in use for charging.

However, this may mean that a user has to connect his vehicle to such an electric charging station after each use and to disconnect it from the electric charging station again before each use. Charging may require the user to go to the electric charging station, pick up an electric charging cable, open a shutter on the charging connector of the vehicle, insert the charging plug of the electric charging cable into the charging connector of the vehicle and thus establish an electrically conductive connection to perform charging. After charging has ended, these steps must be repeated in reverse order. This effort and the time required for this may disturb the user and thus prevent the acquisition and use of such an electrically operated vehicle.

For this reason, charging devices are currently being developed in order to relieve the user of the previously described steps of a charging process as completely as possible. For example, the aim of the joint project AUTOPLES ("Automated Parking & Charging of Electric Vehicle Systems") is that an electrically operated vehicle which, in the absence of the user, automatically drives to an electric charging station within a predetermined radius of action (e.g., within a parking garage) and carries out the charging process there may then, if necessary, return to the user. The corresponding charging station has an actuated mechanical system which may move the charging plug in height and width and extend towards the parked vehicle and retract away from the parked vehicle. A camera is arranged near the charging plug and is oriented at an angle in the direction of the charging plug. By means of the camera and corresponding methods for image processing and image recognition, the charging connector of the vehicle may be optically captured and recognized and the charging plug of the charging station may be inserted into it in order to automatically establish an electrically conductive connection and perform charging. After the charging process has been completed, the disconnection may also take place automatically.

The GINKO initiative ("Generic infrastructure for the seamless energetic coupling of electric vehicles—Chemnitz") pursues a similar goal, whereby a charging plug is guided by the end effector of a six-axis articulated arm robot. A camera is also arranged on the end effector, which is oriented at an angle in the direction of the charging plug.

DE 10 2012 014 936 A1 describes a charging system for a motor vehicle, in particular a passenger car, having a robot with a control means, having a force detection means and having a connector attached to the robot that is designed, with a detachable plug connection with a mating connector on the vehicle, to establish a releasable connection for charging an electrical energy store of the motor vehicle. The control means is set up to communicate with the force detection means and to connect the robot-controlled connector to the mating connector on the basis of a force determined by the force detection means. The charging system also has, in particular robot-controlled, position detection means for determining a position of the mating connector, wherein the control means is set up to communicate with the position detection means and to pre-position the robot-guided connector on the basis of a position of the mating connector determined by the position detection means. The position detection means may in particular have an image recording and processing means, in particular a camera, preferably a CCD camera, and an image recognition device which is set up to identify the mating connector of the motor vehicle in a camera image. In other words, the charging system of DE 10 2012 014 936 A1 may be used for image-based prepositioning of the robot-guided connector, which is followed by a force-controlled insertion of the robot-guided connector.

DE 10 2015 213 160 A1 describes a comparable system with a robot for automatically plugging a charging plug into an interface of a vehicle, in which case the robot is mobile on the one hand and may grasp the charging plug with an actuator and plug it into the interface on the other and may release it after completion of the insertion to move to another position.

U.S. Pat. No. 7,999,506 B1 describes a system that automatically feeds the current into a vehicle with a rechargeable electrical energy store with minimal human intervention using an automatic docking system. The system consists of a robot manipulator with a camera and a processing unit. The system uses the camera and image processing to identify the position of the vehicle and, consequently, the position of the vehicle's charge box. The robot manipulator then directs the plug of the charging cable into the socket of the vehicle. As soon as the charging process is complete, the robot manipulator removes the convector from the vehicle. A CCD camera is used, which may be fixedly arranged on the base of the robot manipulator or on the end effector. Alternatively, a LIDAR system is also used.

U.S. Pat. No. 9,056,555 B1 describes a robotic charging device for an electric vehicle, which may be operated in such a way that it automatically plugs in an electric charging connector for charging the battery pack of an electrically operated vehicle. When the charging process is complete, the device disconnects from the vehicle and moves away from the vehicle. The robotic charging device may move automatically over a subsurface to the electric vehicle. A three-part arm is arranged on a base of the robotic charging device and has the electrical charging connector on its end effector. A pair of cameras are arranged near and on both sides of the electrical charging connector so that the vehicle and the closure of the charging connector may be recognized.

All of the approaches from the prior art described above have in common that only or in part at least one camera, in particular at least one CCD camera, or at least one other image capturing unit is used alone or in part to capture a two-dimensional image of an initial situation that includes at least part of the vehicle and its charging socket or the cover of the charging socket. The position and orientation of the charging socket or its cover is then recognized from this image, and the distance between the charging plug and the end effector and the charging connector is determined. Based on this, the trajectory is then calculated on which the charging stretcher is to be moved by the charging device in order to engage in the charging socket of the vehicle at the end of the trajectory.

Position is understood to be the location within a Cartesian coordinate system at which an object is located in a geometric space. Positioning is understood to mean taking up a specific spatial location. Orientation is understood to mean the alignment of an object to the axes of the Cartesian coordinate system. Assuming an orientation is understood to mean changing the current orientation by rotating around the corresponding axes of the Cartesian coordinate system into a desired orientation. Position and orientation may collectively be referred to as a pose.

The problem here is that the bodies of most vehicles are dark or even black. Most charging sockets are also black. This usually also applies to the linings of the charging sockets. During image processing or image recognition, this means that a black and therefore low-contrast charging connector is to be recognized in front of a black and thus likewise low-contrast lining, which is additionally surrounded by a dark to black body, which is also low-contrast. This may make the optical recognition of the charging connector very difficult. The described circumstance may be made even more difficult by the fact that the lighting conditions, for example from direct sunlight to darkness or between switched on and switched off room lighting, such as a garage, a parking garage deck, etc., may change significantly.

Due to the associated low contrast of the charging socket in the captured image in relation to its surroundings, not only the localization of the charging socket in the two-dimensional image becomes a challenge for image recognition, but essentially also the localization of the charging socket in three-dimensional space.

The localization of the charging socket is made particularly difficult by the fact that the charging socket as a target object usually has to be recognized from a comparatively large distance, which leads to a low image resolution of the relevant area (i.e., the charging socket). This is based on the fact that the charging device is usually in a state that is as compact as possible when not in operation, in order to avoid collisions with the approaching vehicle or with people and the like. Thus, both a stationary image capturing unit and an image capturing unit that may move along with it at the end effector at the time of image capturing are arranged at a maximum distance from the vehicle and its charging socket, so that it is displayed comparatively small in the acquired image and is therefore difficult to recognize, especially in the case of a low contrast situation as described previously.

In this regard, it is recognized from practice that when using image capturing units with standard image resolutions, which are available with a good price/performance ratio, an exact and robust localization of the charging socket as a charging connector in terms of position and orientation from a single image capturing is only possible up to a maximum distance of approx. 50 cm. If the distance between the charging socket and the image capturing unit is greater due to the parking behavior of the user of the vehicle or due to other circumstances, the previously described charging devices may no longer be used reliably. This may be made even more difficult by a large variation in the orientation of the vehicle, for example by parking at an angle in relation to the image capturing unit. The height and the orientation of the vehicle or its charging socket may also vary as a function of the load in the vehicle. Such parking situations may, however, often occur, especially in the garage at home, so that this situation may be very relevant for the practical implementation of such charging devices.

In order to improve the image capturing of an image of the charging socket, cameras may be used as an image capturing unit with the highest possible resolution so that the charging socket may be captured and recognized as reliably as possible by image recognition despite the comparatively large distance between as many pixels as possible. However, this requires correspondingly expensive technology, so that the costs for implementing the charging device may increase significantly.

More complex imaging systems or scanning systems such as laser scanners, depth cameras and the like may also be used to enable robust and precise detection of the 3D object pose of the charging socket (i.e., the position and orientation of the charging socket in three-dimensional space). However, this also leads to significantly higher costs for implementing the charging device.

Alternatively, the image capturing may be supported in that the charging socket, as the target object to be recognized, is artificially separated from the background or emphasized against the background. This may be done, for example, by markers, a contrast ring and the like, which are visibly attached to or around the charging socket on the body of the vehicle, which differ very clearly from the background and are therefore comparatively easy to identify for image recognition. However, this leads to a visual change in the vehicle at least in the area of the charging socket or its cover, which the user may not want for aesthetic reasons. This may be a disadvantage not only for aesthetic reasons but also for economic reasons. Such a contrast ring could have to be retrofitted for all existing vehicles or vehicles that are about to be delivered. It would also require charging socket manufacturers to retrofit the development and production of such charging sockets within the next few years, possibly even having to offer charging sockets with and without a contrast ring. This could lead to additional work with corresponding additional costs.

The charging device may also be supplemented with additional lighting elements in order to improve the quality of the captured image and thus to support the image recognition. However, this also means an additional effort with corresponding costs. Furthermore, additional illumination of the vehicle body may also lead to additional reflections, which may have a more disruptive than beneficial effect on image capturing and image recognition.

An object of the present invention is to provide a method and a device of the type described at the outset, so that the disadvantages described above may be reduced or avoided. In particular, a charging process should be able to be carried out automatically even with a comparatively large distance between the charging device and the vehicle or its charging socket. Additionally or alternatively, this should also be able to take place for as different positions and/or orientations as possible of the vehicle or its charging socket with respect to the charging device. In particular, this should be as simple, reliable and/or inexpensive as possible. This should be done in particular for a land vehicle. At least one alternative to such known methods and devices is to be created.

According to the invention, the object is achieved by a method with the features of claim 1, by a device with the features of claim 17 and by a computer program product with the features of claim 18. Advantageous developments are described in the dependent claims.

The present invention thus relates to a method for automatically connecting a charging connector to a charging connector socket of a vehicle, preferably a land vehicle. The charging connector may also be referred to as a charging plug and the corresponding charging connector socket may also be referred to as a charging socket or mating connector. Automatic is to be understood as the connection of a charging connector to a charging connector socket of a vehicle completely or largely without the support of a user; for example, this method may be triggered by the user, but the method itself may then be carried out without the user being involved. The vehicle may be any type of vehicle, in particular any type of land vehicle, aircraft, spacecraft or watercraft. Preferably, however, the present invention is oriented to a land vehicle such as a bus, a truck or a passenger car.

A connection is understood to mean the establishment of a connection between a charging connector of a corresponding device, as will be described further below, and a corresponding charging connector socket of the vehicle in such a way that an energy store of the vehicle may be charged or filled with energy. This energy may be, for example, electrical energy, but also a fluid such as a liquid such as kerosene, oil, diesel or petrol or a gas. Depending on the energy to be absorbed, the energy store may be a rechargeable accumulator or a liquid tank or a gas tank. The charging connector and the charging connector socket may be an electrical plug and a corresponding electrical plug socket or a tank nozzle and a tank opening, depending on the energy to be transmitted. However, the present invention is preferably oriented towards the electrical charging of at least one rechargeable electrical accumulator of a land vehicle, so that a charging plug is used as a charging connector and a charging socket or a mating connector is used as a charging connector socket.

The method according to the invention has at least the following steps:
first optical capturing of the charging connector socket and/or the vehicle as a first image by means of at least one first image capturing unit which is arranged to be movable with the charging connector,
determining the position of the charging connector socket and/or the vehicle based on the first image,
Reducing the distance between the charging connector and the charging connector socket and/or the vehicle by means of a positioning unit, and
second optical capturing of the charging connector socket and/or the vehicle as a second image by means of the first image capturing unit.

A camera such as a CCD camera may preferably be used as the first image capturing unit. Preferably, precisely one image capturing unit and, in particular, precisely one camera is used in order to enable the implementation of the method as simply and inexpensively as possible. The fact that the first image capturing unit is arranged movably with the charging connector is to be understood as meaning that movements of the positioning unit, which affect the position and/or the orientation of the charging connector, also affect the position and/or the orientation of the first image capture unit. The first image capturing unit is therefore preferably arranged as close as possible to and stationary with the charging connector, so that a joint movement may take place preferably due to a stationary or separable mechanical coupling of the first image capturing unit and the charging connector. In particular, the first image capturing unit and the charging connector may be arranged jointly on an end effector of the positioning unit in order to enable joint movement. The detection area of the first image capturing unit is preferably aligned with the charging connector and the area along a longitudinal axis of the charging connector in front of it, so that the charging connector and the charging connector socket or the vehicle may be optically captured by the first image capturing unit. In particular, the viewing direction of the first image capturing unit may correspond as closely as possible to the joining direction or the joining axis of the charging connector in order to be able to carry out the optical capturing as directly as possible in the direction in which the charging connector and the charging connector socket are merged. The first image capturing unit may preferably be arranged as close as possible to the charging connector and its viewing or detection direction may be aligned both in the direction of the longitudinal axis of the charging connector as the joining axis and parallel to it, as will be described in more detail below.

The first image capturing unit may, however, also have at least two, preferably precisely two, cameras so that stereoscopic image capturing may be made possible. This may enable depth information to be determined from two images captured at the same time, which are at least substantially oriented in the same direction. Taking into account the depth information, a much more precise and robust depth estimate and thus also the determination of the position of the charging connector socket and/or the vehicle based on the first image, which is formed from the two simultaneously captured images of the two cameras, may be improved. If two comparatively inexpensive cameras with a low resolution are used as cameras, the increase in costs due to the use of the second camera of the first image capturing unit may be kept low. The image processing may also continue to be implemented with comparatively little computing power.

The first image capturing unit may also be designed as a multiview camera (i.e., it may have more than two individual cameras).

A positioning unit is understood to mean any possibility of changing the position of the charging connector in space at least two-dimensionally, preferably three-dimensionally. Furthermore, the orientation of the charging connector in space may preferably be changed at least two-dimensionally, preferably three-dimensionally. In particular, driven serial kinematics such as an articulated arm robot and the like may be used as a positioning unit, which may move the charging connector, preferably together with the first image capturing unit. The positioning unit may be arranged in a stationary manner, for example by being permanently arranged on a subsurface, on a wall, on a column, under a ceiling and the like. Alternatively, the positioning unit may also be designed to be movable as a whole on a subsurface in order to obtain a larger radius of action and, for example, to be able to reach more than one vehicle. This may be particularly advantageous if the charging connector is detachably arranged on the positioning unit, so that after a first charging connector has been connected to the charging connector socket of a first vehicle, the positioning unit may receive a second charging connector and carry out the method according to the invention again with the charging connector socket of a second vehicle. This may increase the flexibility of using the positioning unit and further reduce the costs.

The charging connector and preferably also the first image capturing unit is or are preferably arranged on an end effector of the positioning unit, which may be implemented by a detachable but fixed connection as well as gripping the charging connector by a gripper or the like of the end effector. The latter has the advantage that the charging connector may be handled both by the positioning unit and by a user, so that such a charging connector may be used to implement the method according to the invention, which may reduce the costs of a corresponding device compared to a charging connector integrated into the device. Furthermore, as described above, several charging connections may be handled one after the other by the same positioning unit in order to be able to carry out the method according to the invention multiple times with one and the same positioning unit. On the other hand, such a charging connector integrated into the device may make the implementation of the method according to the invention easier, more robust and/or more secure due to the permanent and defined connection between the positioning unit and the charging connector.

The present invention is based on the knowledge that so far only a single optical capturing of the charging connector socket and/or the vehicle has been carried out as a first image by means of at least one first image recording unit with such methods. Based on this single image, the position and orientation of the charging connector socket are then determined. The charging connector socket is then approached as directly as possible by means of a single movement, preferably in the direction of the initially recognized charging connector socket, and the connection between the charging connector and the charging connector socket is established. As described above, this requires a correspondingly high quality of the single captured image in order to be able to reliably optically capture, recognize and approach the charging connector socket even from an initially comparatively large distance of the first image capturing unit or the charging connector. In practice, this leads to the difficulties and costs described at the outset in order to achieve this at least under idealized conditions. For economic use and acceptance by the user, however, the determination of the position and orientation of the charging connector socket has not been sufficiently robust, and the costs are too high.

The basic idea of the present invention is therefore to first only determine the position of the charging connector socket and/or the vehicle based on the first image and then use the positioning unit to move the charging connector and the first image capturing unit closer to the charging connector socket and/or the vehicle. In this way, the distance between the first image capturing unit, which is of course movable with the charging connector, and the charging connector socket or the vehicle may be reduced. The distance is reduced to such an extent that the second image shows a larger representation of the charging connector socket and/or the vehicle, but on the other hand it is so small that a collision of the charging connector, the first image capturing unit and/or the positioning unit with the charging connector socket and/or with the vehicle may be safely avoided.

The charging connector socket or the vehicle are thus shown larger in the second image and may therefore also be recognized more reliably by the image recognition. In other words, by reducing the detection distance, the resolution-related detection error of the charging connector socket may be reduced. In this way, the robustness and reliability of the image recognition and the further steps based on it may be improved without increasing the costs of the device and in particular without increasing the costs for the first image capturing unit, since comparatively complex and thus expensive imaging systems or scanning systems such as, for example, laser scanners, depth cameras and the like may be dispensed with. Rather, image capturing units with customary image resolutions, which are available at a good price/performance ratio, may be used in order to enable an exact and robust localization of a charging connector from a single image recording. This may make it possible, for example, to be able to use an inexpensive CCD camera with a resolution according to the VGA standard of only 640×480 pixels or somewhat better with 800×600 pixels as the first image capturing unit, which significantly reduces the costs of the first image capturing unit and yet may enable a successful implementation of the automatic connection of a charging connector with a charging connector socket of a vehicle. A further advantage of a comparatively low image resolution may also be the reduction of the computing load during detection, which may lead to significantly higher detection rates than when using a higher resolution. This means that the plug-in process may also run significantly faster, since shorter downtimes are required for the image recording of the detection. This may prevent user dissatisfaction from being created by waiting.

Therefore, at this stage of the method according to the invention, it may also be sufficient to recognize the vehicle and, if applicable, the area of the vehicle in which the charging connector socket is to be expected without recognizing the charging connector socket itself. In this case, the charging connector together with the first image capturing unit may approach at least this region of the vehicle in order to then be able to recognize the charging connector socket in the second image. Due to the close positioning and alignment of the first image capturing unit to the charging connector, it is possible to approach the charging connector as close as possible for the final, highly accurate, image-based position measurement of the charging connector socket in order to minimize the remaining distance for the subsequent merging of the charging connector and the charging connector socket. At the same time, this may minimize the influence of inaccuracies in determining the position of the positioning unit.

Furthermore, due to the inaccuracies of the first image capturing unit, especially when determining the orientation of the charging connector socket, it is conceivable to approach the final position based only on the detected position of the charging connector socket, but without taking into account the orientation of the charging connector socket. This may ensure that the charging connector socket is in the final search position in the field of view of the first image capturing unit and does not get out of the capturing area of the first image capturing unit due to inaccuracies in the previous orientation determination, which could lead to the search process being aborted.

Optical capturing may preferably include at least one twice-repeated optical measurement with a constint search position, so that an increase in the detection accuracy and/or the detection robustness may be achieved, for example by filtering mean values over several measurements.

According to one aspect of the present invention, the first optical capturing of the charging connector socket and/or the vehicle takes place at an initial distance between the charging connector and the charging connector socket and/or the vehicle. In this way, the implementation of the method according to the invention may be started when the corresponding device is as far away as possible from the charging connector socket or the vehicle in order to avoid a collision of the charging connector, the first image capturing unit and/or the positioning unit with the charging connector socket and/or to be able to safely avoid it with the vehicle.

According to a further aspect of the present invention, the method has the further steps:
  determining the position of the charging connector socket and/or the vehicle based on the second image,
  a again reducing the distance of the charging connector to the charging connector socket and/or to the vehicle by means of the positioning unit, and
  a third optical capturing of the charging connector socket and/or the vehicle as a third image by means of the first image capturing unit.

This aspect of the present invention is based on the knowledge that, for example, due to a comparatively low resolution of the first image capturing unit, a first approach to the charging connector socket or the vehicle may not be sufficient to identify the charging connector in the second image with sufficient accuracy, as is required for connecting, Therefore, an iterative step-by-step approach of the charging connector including the first image capturing unit to the charging connector socket may take place in two or more steps until an image may be acquired which is of sufficient quality so that, based on this image, the further steps such as aligning the orientation of the charging connector to the charging convector socket in order to be able to carry out the connection, as will be described in more detail below. These process steps may thus be repeated several times depending on the application. Iterative may also include continuously (i.e., detection takes place simultaneously with the movement of the end effector).

According to a further aspect of the present invention, the first optical capturing and/or the second optical capturing and/or the third optical capturing involves changing the position and/or the orientation of the first image capturing unit with respect to the charging connector socket and/or the vehicle by means of the positioning unit ahead and/or follows it. In this way, account may be taken of the fact that a position of the first image capturing unit from which an image is to be captured may be unsuitable for this, for example due to reflections, solar radiation and the like. If the detection of the charging connector fails it is not recognized in the currently captured image) the position and/or the orientation of the first image capturing unit relative to the charging connector socket and/or the vehicle may automatically be changed as often by means of the positioning unit and the detection of the image may be repeated until an image of sufficient quality may be captured, which may then be used as the first, second or third image, in other words, the capturing of the image may be repeated in each case until the capturing of an image is of sufficient quality that a successful detection of the charging connector, in particular with regard to its orientation, is possible. These changes in the position and/or the orientation of the first image capturing unit may preferably be made by sideways movements, movements in height and pivoting movements in order not to change the distance to the charging connector socket or to the vehicle at all or only to a minor extent, and thereby avoid collisions.

According to a further aspect of the present invention, the method has the further step:
  Determining the position and the orientation of the charging connector socket based on the second image or based on the third image.

Assuming that, for example, an image could be captured as the second or third image with a quality which, in addition to determining the position of the charging connector socket, also enables the orientation of the charging connector socket to be determined reliably, this information may now also be obtained for the first time from the second or third image. As a result, all information may now be available in sufficient quality to be able to carry out the connection.

According to a further aspect of the present invention, the distance of the charging connector to the charging connector socket and/or to the vehicle is captured by means of at least one distance sensor which is arranged to be movable with the charging connector, wherein the determination of the position and/or the orientation of the charging connector socket and/or of the vehicle in the first image and/or in the second image and/or in the third image takes into account the distance captured by the distance sensor. An ultrasonic sensor may preferably be used as the distance sensor, so that this additional function may be implemented in a simple, reliable and/or inexpensive manner.

This aspect of the present invention is based on the knowledge that the distance between the charging connector and the charging connector socket or the vehicle may additionally be captured by means of a distance sensor which may move with the charging connector. The maintenance of a sufficient distance between the charging connector and the charging connector socket or the vehicle may thus be monitored simply, reliably and/or inexpensively in order to avoid collisions of the charging connector with the charging connector socket or with the vehicle as safely as possible.

The distance between the charging connector and the charging connector socket or the vehicle, which results from the image recognition of the respective image, may be compared with the distance between the charging connector and the charging connector socket or the vehicle, which is captured by the distance sensor. This comparison of the data may increase the process reliability in order to avoid a collision of the charging connector with the charging connector socket or with the vehicle as reliably as possible. This may also be ensured by the redundancy of the distance information in the sense of failure protection if either the first image capturing unit or the distance sensor should fail. In particular, the failure or the faultiness of the first image capturing unit or the distance sensor may be recognized in general and even at an early stage if the two distance information items differ too clearly from one another. This may increase the security of the method, since in this case the method according to the invention may be interrupted and a user may be alerted.

According to a further aspect of the present invention, the position and/or the orientation of the charging connector socket and/or the vehicle is determined in the first image and/or in the second image and/or in the third image, taking into account the previous change of position and/or change of orientation of the positioning unit. For this purpose, the previously performed movements of the drives of the positioning unit since the beginning of the method may be captured and the current position and/or orientation of the charging connector including the first image recording unit with respect to the charging connector socket may be calculated as a reference coordinate system using a model of the known kinematics of the positioning unit. When using stepper motors, for example, the steps may be counted so that this information may be obtained very easily and directly. This position and/or orientation of the charging connector and the first image capturing unit may then be compared with the position and/or orientation of the charging connector including the first image capturing unit, which results from the image recognition, in order to be able to determine the plausibility of the result of the image recognition. If the two positions and/or orientations deviate too clearly from one another, then the process may be interrupted and a user may be alerted. This may increase the reliability of carrying out the method according to the invention. If information from a distance sensor is also available, as described above, this information may also be taken into account for the plausibility check or as failure protection.

According to a further aspect of the present invention, at least one optical capturing of the charging connector socket and/or the vehicle, preferably each optical capturing of the charging connector socket and/or the vehicle, takes place with illumination of the charging connector socket and/or the vehicle by means of at least one lighting unit which is preferably arranged movably with the charging connector. In this way, a higher and, in the ideal case, constant contrast may be achieved in the detection area of the first image capturing unit, whereby the quality of the image capturing and image recognition may be improved. This may increase the detection accuracy of the charging connector socket or of the vehicle. Arranging the lighting unit with the charging connector so that it may move at the same time may favor the fact that the detection area of the first image capturing unit is reliably illuminated without having to also illuminate its surroundings, which could represent additional effort without benefit. This may thus keep the costs and effort for implementing the lighting unit low. The lighting unit is preferably attached eccentrically on the end effector. The lighting unit preferably has at least two LEDs which, because of their high performance, may be used at low cost at the same time. The use of a lighting unit as a light source is particularly advantageous in dark light conditions.

According to a further aspect of the present invention, the method has the further steps:
Aligning the charging connector with respect to the charging connector socket by means of the positioning unit, and
Merging the charging connector and the charging connector socket by means of the positioning unit.

Alignment is understood to mean that the charging connector is positioned on the one hand along a joining or connecting axis opposite the charging connector receptacle and, on the other hand, is rotated around the joining or connecting axis in terms of its orientation in such a way that the subsequent merging as connecting may be performed by means of a linear movement along the joining or connecting axis. In this way, a connection or a merging may be achieved and jamming and tilting avoided as far as possible.

According to a further aspect of the present invention, the alignment of the charging connector with respect to the charging connector socket has the sub-steps:
Aligning the first image capturing unit with respect to the charging connector socket, and
Moving the first image capturing unit, preferably in height, away from the charging connector socket, so that the charging connector is positioned oriented in front of the charging connector socket.

In this way, an intermediate step may be carried out before the merging in order to facilitate or ensure the merging. First of all, the first image capturing unit, which is of course also movable with the charging connector, may be aligned (i.e., positioned and oriented) with respect to the charging connector socket, as the charging connector has to be for the merging. As a result, after the alignment, the charging connector socket may be completely visible as a compensatory movement in the detection area of the first image capturing unit, so that the charging connector socket may be completely optically captured as an image. In this state, the charging connector is positioned at a distance from the first image capturing unit away from the charging connector socket and may be aligned as desired. Rather, in this last detection step, the final orientation of the charging connector is determined as precisely as possible, which is then used for the final alignment of the charging connector to the charging connector socket. The orientation of the charging connector to the charging connector socket before and after the compensating movement may be identical, but this is usually not the case. The compensating movement may also take place simultaneously with approaching the charging connector socket (i.e., the end effector may come to a standstill directly in the position that would also result from the compensating movement). This may speed up the implementation of the procedure.

The determination of the final orientation of the charging connector with respect to the charging connector socket may be achieved in that the fixed kinematic relationship between the first image capturing unit and the charging connector is known. In particular, this may be facilitated by the fact that a line of sight of the first image capturing unit is aligned parallel to a joining or connection axis of the charging connector. This may simplify the alignment of the charging connector with respect to the charging connector socket or increase the quality of the alignment in order to avoid jamming and tilting when merging as far as possible. A corresponding actuated Z-axis of the corresponding device may be used to move, for example, in height.

According to a further aspect of the present invention, the charging connector and the charging connector socket are brought together by means of a linear movement of the charging connector, wherein the linear movement of the charging connector preferably takes place by means of an actuated linear axis of the positioning unit. This may simplify the merging, in particular to avoid jamming and tilting as far as possible. This may preferably take place with the other axes and drives of the positioning unit being fixed at the same time, in order to exclude their influences on the movement of the merging.

The merging by means of an additional actuated linear axis of the positioning unit may be advantageous in that with a purely one-dimensional movement fewer deviations in positioning and orientation may occur than with a multi-dimensional movement in space, which could be carried out by the positioning unit as a whole. In particular with multi-axis kinematics and in particular with a six-axis articulated arm robot, such a combined movement of several axes and drives to carry out a linear movement to merge the charging connector and charging connector socket may lead to strong deviations in the positioning and orientation of the charging connector, especially at a position of the end effector with the charging connector extended far from the base of the positioning unit. This may be avoided by an additional actuated linear axis of the positioning unit.

According to a further aspect of the present invention, the method has the further steps:
- repeated optical capturing of the charging connector and/or the charging connector socket and/or the vehicle during the merging by means of the first image capturing unit, and
- in each case comparing a currently captured image with a previously captured image, preferably with the previously captured image, and/or
- repeated detection of the distance of the charging connector to the charging connector socket and/or to the vehicle during the merging by means of at least one distance sensor which is preferably arranged with the charging connector, and
- in each case comparing the currently captured distance with a previously captured distance, preferably with the previously captured distance.

This aspect of the present invention is based on the knowledge that information may be captured in order to monitor the process of merging and to identify faults. On the one hand, this may be done by means of the first image capturing unit, in that images of the charging connector and/or the charging connector socket and/or of the vehicle are continuously captured and compared with one another during the merging at intervals which are regular and close together. If during this comparison it is found that, despite the continuous movement of the merging, there is no optical change of the captured images to one another, it may be concluded that the merging is blocked, for example, by tilting or jamming, and is not carried out as intended. The merging may then be stopped, if necessary even canceled and reversed, and the user may be informed.

This may additionally or alternatively be carried out by means of a distance sensor, in which case the reduction in the distance is considered. If the distance is not reduced despite the continuous movement of the merging, it may also be concluded based on this that the merging is blocked, for example, by tilting or jamming, and is not carried out as intended. If both changes in status are captured, they may also be compared with one another in order to check the plausibility of the conclusions drawn from this and to provide failure protection for this function through the other status capturing.

At the same time, for example, the motor currents of those drives of the positioning unit that are involved in the merging process may be viewed. If at least one motor current increases without a movement of the charging connector and/or a reduction in the distance being able to be detected at the same time, a blockage of the charging connector may also be detected in this way and this may be reacted to. This information may also be used to check the plausibility of the other changes in status and as failure protection, as described above.

According to a further aspect of the present invention, the method has the further steps:
- repeated optical capturing of the charging connector and/or the charging connector socket and/or the vehicle in the merged state as further images by means of the first image recording unit, and
- comparing the currently captured image with a previously captured image, preferably with the previously captured image, and/or
- repeated detection of the distance of the charging connector to the charging connector socket and/or to the vehicle in the merged state by means of at least one distance sensor which is preferably arranged with the charging connector, and
- in each case comparing the currently captured distance with a previously captured distance, preferably with the previously captured distance.

This aspect of the present invention is based on the knowledge that information may be captured in order to monitor the merged state and to identify faults. This may be done on the one hand by means of the first image capturing unit, in that in the merged state images of the charging connector and/or the charging connector socket and/or of the vehicle are continuously captured and compared with one another or at regular intervals that are close together. If it is found during this comparison that, despite the completed movement of the merging, optical changes of the captured images compared to one another take place, it may be concluded that at least one of the connection partners is being moved, although on the part of the method according to the invention movements should no longer take place. For example, the vehicle may be put into operation and moved, which may lead to damage to the charging connector and the charging connector socket and also endanger the environment. The positioning unit may also be touched, for example, by a user, by another vehicle and the like and thereby moved, which may also endanger the security of the connection between the charging connector and the charging connector socket. This may be recognized as a disruption in the connection, for example the charging process may be interrupted for safety reasons and the charging connector may be separated from the charging connector socket by means of the positioning unit. The user may also be informed.

This may additionally or alternatively be carried out by means of a distance sensor, in which case the change in the distance is considered. If there is a change in the distance despite the completed movement of the joining, it may also be concluded based on this that an unintentional movement of at least one of the connection partners is taking place. If both changes in status are captured, they may also be compared with one another in order to check the plausibility of the conclusions drawn from this and to provide failure protection for this function through the other status capturing.

According to a further aspect of the present invention, the method has the further steps:
- optical capturing of the charging connector and/or the charging connector socket and/or the vehicle in the merged state as a further image by means of the first image recording unit, and
- comparing the further image with the second image or with the third image.

In this way it is possible to view the connection partners both before the merging and after the merging and to compare these images with one another. If discrepancies are detected here, it may be concluded that there was contact between the charging connector and the charging connector socket or its immediate surroundings, such as its lining and/or the vehicle or its body, which a has left a visually recognizable trace. This may be a dent, scratch, or the like. This may thus be recognized automatically and, for example, communicated to the user. This may also be communicated, for example, to the operator of the corresponding device, such as a parking garage operator, so that he may react to the damage be is responsible for to the vehicle of the user as a customer before the user himself recognizes the damage to his vehicle due to the charging process. In addition to psychological effects on the business relationship, this may also have legal consequences, so that it may be very much in the interests of the operator of the device to be the first to find out about this damage and to be able to react to it.

According to a further aspect of the present invention, the surroundings of the positioning unit and/or the charging connector are monitored at least temporarily, preferably continuously, by means of the first image capturing unit and/or by means of at least one distance sensor of the positioning unit, which is preferably arranged with the charging connector. In this way, the elements that are already present may also be used to increase security. For example, people, vehicles and the like may be recognized which come so close to the charging connector, the positioning unit and/or the vehicle during the execution of the method and during the charging process that the safety of the people, the vehicle and the like and the device could be endangered.

According to a further aspect of the present invention, at least one second image capturing unit is used to optically capture a working space of the positioning unit at least temporarily, preferably continuously, wherein collision monitoring of the workspace and/or prepositioning of the charging connector based on at least one optically captured image of the second image capture unit takes place for charging connector receiving and/or to the vehicle by means of the positioning unit. The second image capturing unit may be designed in the same way as the first image capturing unit in order to generate the lowest possible costs here as well. In particular, the second image capturing unit may also be a CCD camera, preferably with a comparatively low resolution. The second image capturing unit may be designed as a 180° camera or a 360° camera in order to be able to optically capture the entire working space as far as possible without having to move and in particular rotate. This may ensure or simplify the optical capturing of the relevant area.

The second image capturing unit may be arranged in a stationary manner, for example on a wall or on a ceiling, and oriented towards the working space of the positioning unit. The second image capturing is preferably arranged in an elevated position (i.e., at a distance from a ground) so that the working space may be captured, if possible, at an angle from above. This may avoid or minimize disruptions in the optical capturing of the working space, for example by the positioning unit. Alternatively, the second image capturing unit may also be arranged movably with the positioning unit, for example on a member of the positioning unit which is not the same member that carries the first image capturing unit. In particular, the second image capturing unit may be arranged on a member of the positioning unit which is further away from the charging connector than the first image capturing unit, so that a larger area and preferably the entire working space of the positioning unit may be optically captured by the second image capturing unit. The working space of the positioning unit is to be understood as meaning all positions in Cartesian space which may be reached by the positioning unit and in particular its de-effector and/or the charging connector.

To carry out collision monitoring, images may preferably be captured continuously or at least at short intervals and evaluated by means of image recognition to determine whether, for example, a user is moving into the working space or is already there. If this is the case and if this is recognized, the charging process may be interrupted, for example.

To carry out pre-positioning, the working space may be captured once or with a few images in a state in which the first image capturing unit has not yet been active or at least the positioning unit has not yet been active and the charging connector is still in its initial position. The first steps of the method according to the invention may then be carried out beforehand with the second image capturing unit instead of with the first image capturing unit in order to bring the charging connector into a starting position by means of the positioning unit, from which the first image capturing unit may then operate and initialize the previously described method step. In this way, the second image capturing unit may be used to preposition the charging connector.

The present invention also relates to a device for automatically connecting at least one charging connector to a charging connector socket of a vehicle, with at least one positioning unit which is designed to position the charging connector, preferably also to orient it, with at least one first image capturing unit which is arranged to be movable with the charging connector and is designed to optically capture at least the charging connector socket of the vehicle, and with at least one control unit which is designed to carry out a method as described above, By means of such a device, the implementation of a previously described method may be made possible in order to use its properties and advantages.

The positioning unit may preferably have a rotatably actuated axis of the charging connector or of an end effector which may grip the charging connector or to which the charging connector may be arranged in a fixed manner. As a result, the orientation of the charging connector about its vertical axis may be easily and directly adapted to the current orientation of the charging connector socket as a function of the respective parking position of the vehicle.

The positioning unit may also have a manual adjustment and/or actuation of the orientation of the charging connector in order to adapt the orientation of the charging connector to the vehicle-specific inclination of the charging connector socket.

The device according to the invention may use a comparatively low-resolution and thus inexpensive first image capturing unit, which on the one hand may keep the costs of purchasing the first image capturing unit low. At the same time, this may reduce the demands on the control unit, since no high-resolution image data have to be processed. As a result, an inexpensive control unit and particularly preferably embedded hardware architectures may also be used, which may be compact and energy-saving at the same time.

The present invention also relates to a computer program product with a program code, which is stored on a medium that may be read by a computer, for carrying out a method as described above. The computer-readable medium may be internal memory of a computer as well as removable memory such as a floppy disk, a CD, a DVD, a USB stick, a memory card and the like. In this way, the method according to the invention may be made available to a computer, which may be a control unit of a device according to the invention.

An exemplary embodiment and further advantages of the invention are explained below in connection with the following figures. Shown are:

FIG. 1 a first schematic side view of a device according to the invention when performing a method according to the invention;

FIG. 2 a second schematic side view of a device according to the invention when performing a method according to the invention;

FIG. 3 a third schematic side view of a device according to the invention when performing a method according to the invention;

FIG. 4 a fourth schematic side view of a device according to the invention when performing a method according to the invention;

FIG. 5 a fifth schematic side view of a device according to the invention when performing a method according to the invention;

FIG. 6 a sixth schematic side view of a device according to the invention when performing a method according to the invention; and FIG. 7 a schematic flowchart, side view of a device according to the invention when performing a method according to the invention.

The above figures are viewed in Cartesian coordinates. A longitudinal direction X extends, which may also be referred to as depth X. A transverse direction, which may also be referred to as the width (not shown), extends perpendicular to the longitudinal direction X. A vertical direction Z, which may also be referred to as the height Z, extends perpendicular to both the longitudinal direction X and the transverse direction.

As shown in FIGS. 1 to 6, a device 1 according to the invention for automatically connecting a charging connector 12 to a charging connector socket 21 of a vehicle 2, which will be referred to below as charging device 1 for short, has a positioning unit 10, which is designed as a robot arm 10. The upper arm 10 is fixedly arranged on a ground 3 at one end of its kinematic chain, which represents its base. From this base as the first link of the robot arm 10, this extends over several actuated joints and links to its opposite end, which has an end effector 11. The previously mentioned charging connector 12, which may also be referred to as a charging plug 12, is arranged on the end effector 11. The charging plug 12 is designed to be connected in an electrically conductive manner by being brought together in the form of being plugged into one another with the charging connector socket 21 also mentioned above in such a way that electrical energy may be transferred. The charging connector socket 21 may also be referred to as a charging socket 21 or a mating connector 21. The area that may be reached by the robot arm 10 represents its working space B.

The charging socket 21 is arranged on the vehicle 2 already mentioned above, which is an electrically operated vehicle 2 in the form of a passenger vehicle 2 and therefore also has a rechargeable electrical energy storage device in addition to an electrical drive (not shown). This rechargeable electrical energy store may be fed electrically by the charging device 1 and thereby charged when the charging plug 12 is plugged into the charging socket 21 and a charging process is being carried out. For this purpose, the charging socket 21 is connected in an electrically conductive manner to the rechargeable electrical energy store (not shown) and is arranged in the body 20 of the vehicle 2 in an externally accessible manner. Outside of the charging process, the charging socket 21 may be covered, protected and closed by means of a cover such as a tank cap (not shown). To release the charging socket 21, the tank cap may be released by the vehicle 2 or by its user, for example by means of a lockable spring mechanism, and the charging socket 21 may thereby be made accessible to the charging plug 12.

In addition to the charging plug 12, the end effector 11 has a first image capturing unit 13 in the form of a first camera 13, which is designed as a CCD camera with a comparatively low resolution of only 640×480 pixels, which makes the implementation of the first image capturing unit 13 comparatively inexpensive. The first image capturing unit 13 may, however, also have a pair of cameras 13, which may be aligned close to one another and substantially in the same direction, so that stereoscopic image capturing may be made possible.

The first camera 13 is arranged in a stationary manner close to the charging plug 12 above it and its detection area C is oriented in the direction in front of the charging plug 12. The viewing direction or the axis of the first camera 13 substantially corresponds to the joining direction or the joining axis of the charging plug 12, so that they are oriented substantially parallel to one another.

A lighting unit 14 is fixedly arranged on the first camera 13, the illumination area D of which is aligned in the direction of the capturing area C of the first camera 13 in order to illuminate an image to be captured as well as possible and thereby increase the contrast of the captured image. The lighting unit 14 preferably has LEDs that are as strong as possible as lighting means in order to achieve the greatest possible illumination with the least possible effort. The lighting unit 14 may therefore also be referred to as an LED light 14.

A distance sensor 15, which is designed as an ultrasonic sensor 15, is arranged in a stationary manner below the charging plug 12. The detection area E of the distance sensor 15 is aligned in the direction of the detection area C of the first camera 13 in order to capture the distance between the charging plug 12 in the direction of its joining direction or joining axis.

A second stationary image capturing unit 17 is also provided, which is fastened to a wall or ceiling above the robot arm 10 and is designed to optically capture the working space B of the robot arm 10.

The charging device 1 also has a control unit 16, which may also be referred to as a computer unit 16. The control unit 16 is connected in a signal-transmitting or energy-transmitting manner to the first camera 13, to the lighting unit 14 and to the distance sensor 15 in order to operate them, if necessary to control or regulate them and to receive their data. Furthermore, the control unit 16 is connected to the drives of the robot arm 10 in order to operate them, wherein the drive information of the drives of the robot arm 10 is also captured by the control unit 16. Furthermore, the control unit 16 may also control or regulate the transmission of electrical energy via the charging plug 12 to the charging socket 21.

Based on these functions, the control unit 16 may carry out a method according to the invention for automatically connecting the charging plug 12 to the charging socket 21 of the vehicle 2 as follows, cf, flowchart of FIG. 7:

According to the method according to the invention, a first optical capturing 100 of the region of the vehicle 2 which has the charging socket 21 is first carried out by means of the first camera 13, as a first image. The first optical capturing 100 takes place from an initial position of the robot arm 10, so that the end effector 11 with the charging plug 12 is initially as large as possible to the maximum distance from the vehicle 2 or its charging socket 21, see FIG. 1. As a result, a collision of the vehicle 2 with the charging device 1 when parking may be avoided as certainly as possible.

The position of the charging socket 21 or of the vehicle 2 is then determined 200 based on the first image. This may be carried out using known methods for image processing and image or pattern recognition, so that the position of the charging socket 21 or of the vehicle 2 in relation to the charging plug 12 may be calculated. This also results in the distance of the charging plug 12 from the charging socket 21 or from the vehicle 2.

The present invention is based on the knowledge that due to the comparatively low quality of the first camera 13 in terms of its resolution and the initially large distance between the first camera 13 and the vehicle 2, the charging socket 21 is insufficient for connecting the charging plug 12 and charging socket 21 or cannot be recognized at all. Therefore, the capturing and recognition of such information from the first image is not the aim of this step of the method according to the invention.

Rather, there is now a reduction 300 of the distance between the charging plug 12 and the charging socket 21 or the vehicle 2 by means of the robot arm 10 in a movement direction A of the charging plug 12 or the end effector 11, see FIG. 2. In this case, the charging plug 12 is moved as far as possible towards the charging socket 21 or the vehicle 2, but without risking a collision with the charging socket 21 or the vehicle 2, which could lead to damage. As a result, the first camera 13 is also brought closer to the charging socket 21 or to the vehicle 2, so that during a second optical capturing 400 of the charging socket 21 or the vehicle 2 as second image, the charging socket 21 may be captured with a higher resolution in the sense of a larger image or projection of the charging socket 21. This may improve the quality of the image capturing or image recognition.

If necessary, for example, as a further iterative approximation process, the position of the charging socket 21 or of the vehicle 2 may be determined 410 based on the second image, the quality of which, however, may not be sufficient for the subsequent steps, as will be described further below, see FIG. 2. The distance between charging plug 12 and charging socket 21 or vehicle 2 may then be reduced again 420, so that a third optical capturing 430 of charging socket 21 or vehicle 2 as a third image may be carried out by means of first camera 13 from this further approximate position. This may be repeated until the currently captured image is of sufficient quality for the subsequent steps, see dashed arrow in FIG. 7. If this iterative approximation is not required, steps 410 to 430 may be skipped, see solid arrow in FIG. 7.

If the required quality of the captured image is achieved, for example as a second or third image, the position and orientation of the charging socket 21 may be determined 500 based on the second image or based on the third image, see FIG. 3, Since the orientation of the charging socket 21 may now also be recognized, which is necessary for establishing a connection between the charging plug 12 and the charging socket 21, the charging plug 12 may now be aligned 600 with respect to the charging socket 21 by means of the robot arm 10.

The alignment 600 may include the sub-steps that first an alignment 610 of the first camera 13 with respect to the charging socket 21 takes place by positioning the first camera 13 directly in front of the charging socket 21 and is aligned with its viewing axis exactly on the joining axis of the connection between the charging plug 12 and the charging socket 21, see FIG. 4, The first camera 13 may then be moved 620 at height Z away from the charging socket 21, wherein the orientation is maintained. In this case, in the event that the first camera 13 is arranged laterally to the charging plug 12 in the transverse direction Y, the method 620 may accordingly also take place laterally. Furthermore, the alignment 600 may preferably take place in combination with the approach of the charging plug 12 to the charging socket 21 in order to save time.

The method is carried out by a distance which corresponds to the distance between the viewing axis of the first camera 13 and the joining axis of the charging plug 12, which run essentially parallel to one another. This at least almost parallel alignment of the optical axis of the first camera 13 and the joining axis may help the charging socket 21 to be completely visible in the captured image during alignment 600. Since the orientation of the first camera 13 to the joining axis of the charging socket 21 does not have to be identical or ideally parallel to the orientation of the charging plug 12 to the charging socket 21, the remaining orientation deviation in the aligned position and orientation of the alignment 600 may be used as the last search position in which the first camera 13 is located exactly in front of charging socket 21, determined based on images and then taken into account in method 620 of first camera 13 in order to finally align the charging plug 12 with high precision with the charging socket 21 so that no jamming occurs during subsequent joining. In other words, in the final search position, the charging socket 12 may be clearly rotated relative to the line of sight of the first camera 13 (i.e., because the vehicle 2 was parked at an angle). As long as the charging socket 12 is fully captured in the camera image, however, the orientation deviation may then be determined and the orientation of the charging plug 12 to the inclined position of the vehicle 2 corrected during the process 620 of the end effector 11 before the plugging process is initiated.

Since this distance is fixed and known due to the design, a very precise optical alignment of the first camera 13 to the charging socket 21 may take place and, by moving the end effector 11 exactly perpendicular to the viewing axis of the first camera 13 or to the joining axis of the charging plug 12 with the same orientation, the charging plug may be positioned in front of the charging socket 21 as was previously the first camera 13, see FIG. 5. This may enable very precise positioning and orientation of the charging plug 12 with respect to the charging socket 21.

The charging plug 12 and the charging socket 21 may now be merged 700 by means of the robot arm 10. However, the joints of the robot arm 10 are not used for this, but the robot arm 10 has an actuated linear axis on the end effector 11 (not shown), which may move the charging plug 12 along its joining axis to the charging socket 21 and into it, see FIG. 6. As a result, the charging plug 12 may move as purely linearly as possible to the charging socket 21, so that tilting and jamming when merging 700 may be avoided by design and thus as simply and reliably as possible.

After the merging 700 has been completed, the charging plug 12 is connected to the charging socket 21, so that an electrically conductive connection now exists which may be used to charge the rechargeable electrical energy store of the vehicle 2. This charging process may now be started, operated in a controlled or regulated manner and also ended by the charging device 1, for example.

During the merging 700, a repeated optical capturing 710*a* of the charging plug 12 and the charging socket 21 or the vehicle 2 may also take place by means of the first camera 13. Furthermore, a comparison 720a of a currently captured image with the previous captured image may be carried out in each case. If it is recognized that there is little or no change in the images to one another than before, it may be concluded that the merging 700 is not being carried out as desired, because, for example, the charging plug 12 has jammed or tilted or blocked in some other way with respect to the charging socket 21, In this case, the merging 700 may be canceled and the user may be alerted. The charging plug 12 may also be pulled out of the charging socket 21 and plugged in again.

In addition, a repeated detection 710b of the distance of the charging plug 12 to the charging socket 21 or to the vehicle 2 during the merging 700 by means of the distance sensor 15 may be carried out in parallel. From a respective comparison 720b of the currently captured distance with the previously captured distance, it may also be recognized whether the merging 700 is being carried out as desired or not.

These findings may be compared with the findings that are obtained simultaneously from the evaluation of the repeated optical capturing 710a of the charging plug 12 and the charging socket 21 or of the vehicle 2 by means of the first camera 13 in order to mutually check the plausibility of these findings and to provide failure protection for these functions against each other. For this purpose, the motor currents of the actuated linear axis of the end effector 11 as well as the other drives of the robot arm 10 may also be used, which would increase in the event of a blockage of the merging 700 without a movement of the charging plug 12 or a change in distance being visually recognizable. This may also contribute to checking the plausibility of the findings described above.

In the merged state of the charging plug 12 and the charging socket 21, a repeated optical capturing 800a of the charging plug 12 and the charging socket 21 or of the vehicle 2 may be carried out as further images by means of the first camera 13, Furthermore, a comparison 900a of the currently captured image with one or with the previous captured image may take place. In this way it may be recognized whether there are movements of the charging plug 21, the vehicle 2 and/or the robot arm 10, which are excluded in this state by the charging process. However, if relative movements are detected, an external disturbance may be inferred and, for safety reasons, the charging process may be interrupted and the user may be alerted.

Likewise, repeated capturing 800b of the distance between the charging plug 12 and the charging socket 21 or the vehicle 2 in the merged state may take place by means of the distance sensor 15, likewise, a comparison 900b of the currently captured distance with one or with the previous captured distance may be carried out in each case. External disturbances to the charging process may also be deduced from changes in the distance, as described above.

The first camera 13 may also be used to carry out an optical capturing 800c of the charging plug 12 and the charging socket 21 or of the vehicle 2 as a further image in the merged state. A comparison 900c of the further image with the second image or with the third image may then take place, which were captured before the merging 700, This comparison may be used to check whether the merging 700 caused damage to the charging socket 21 or the vehicle 2, which may then be reported to an operator of the charging device 1 and/or the user, for example.

During the method steps described above, the distance of the charging plug 12 to the charging socket 21 or to the vehicle 2 may be captured by means of the distance sensor 15, wherein the determination 200, 410, 500 of the position of the charging socket 21 or of the vehicle 2 in the first image, in the second image and/or in the third image, may take place taking into account the distance captured by means of the distance sensor 15. As a result, the captured distance may also be used for the plausibility check of the optically determined position of the charging socket 21 or the resulting remaining distance between the charging plug 12 and the charging socket 21. This may increase the safety when the charging plug 12 approaches the charging socket 21 or the vehicle 2.

During the method steps described above, the determination 200, 410, 500 of the position of the charging socket 21 or of the vehicle 2 in the first image, in the second image and/or in the third image, takes place while taking into account the previous change in position and/or change in orientation of the robot arm 10. For example, when using stepper motors, the respective steps or step changes that have taken place may be counted and the position and orientation of the end effector 10 or the charging connector 12 may be calculated using a kinematic model of the robot arm 10. This also enables a plausibility check of the optically determined position of the charging socket 21 or of the remaining distance between the charging plug 12 and the charging socket 21 resulting therefrom.

During the method steps described above, each optical capturing 100; 400; 430 of the charging socket 21 or of the vehicle 2 with illumination of the charging socket 21 or of the vehicle 2 takes place by means of the lighting unit, in order to increase the contrast in the captured image. This may improve the image recognition in each case.

During the method steps described above, collision monitoring of the surroundings of the robot arm 10 and of the charging plug 12 may be carried out continuously by means of the first camera 13 and the distance sensor 15. This may increase the reliability of the implementation of the method steps described above without additional sensors and the like having to be used for this purpose.

Furthermore, a collision monitoring of the working space B may take place by means of the second image capturing unit 17. Alternatively or additionally, the charging plug 12 may be prepositioned by means of the second image capturing unit 17, in which steps 100 to 400 are carried out in advance based on at least one image that was acquired with the second image capturing unit 17. Thus, steps 100 to 400 may take place from a position of the charging plug 12 that is already approximated to the charging socket 21, which may improve the quality of the optical image capturing by means of the first camera 13.

According to the invention, a connection of the connection partners may be carried out automatically in this way even with a comparatively large distance between the charging plug 12 and the charging socket 21, in order to then carry out a charging process. In particular, this may take place with different positions and/or orientations of the vehicle 2 or the charging socket 21 relative to the charging plug 12. This may be done with comparatively simple and inexpensive means, in particular with regard to the resolution of the first camera 13, in that an iterative approach of the first camera 13 including the charging plug 12 to the charging socket 21 takes place until the charging socket 21 may also be recognized by the first camera 13 with a comparatively low resolution qualitatively sufficiently such that the merging 700 may be carried out.

REFERENCE LIST (PART OF THE DESCRIPTION)

A. Direction of movement of the charging connector 12
B. Working space of the device 1
C. Capturing area of the first image capturing unit 13
D. illumination area of the lighting unit 14

E. Capturing range of the distance sensor 15
X Longitudinal direction; depth
Z Vertical direction; height
1 (Charging) device
10 Positioning unit; robotic arm
11 End effector with actuated linear axis
12 Charging connector; charging plug
13 First image capturing unit; first camera; first pair of stereo cameras
14 Lighting unit; LED light
15 Distance sensor; ultrasonic sensor
16 Control unit; computing unit
17 Second image capturing unit; second camera
2 Vehicle; passenger vehicle
20 Body
21 Charging connector socket; charging socket; mating connector
3 Subsurface
100 First optical capturing as first image
200 Determining position based on first image
300 Reducing the distance between the charging connector 12 and the charging connector socket 21 and/or the vehicle 2
400 Second optical capturing as a second image
410 Determining position based on second image
420 Reducing the distance again
430 Third optical capturing as a third image
500 Determining position and orientation based on the second image or based on the third image
600 Aligning the charging connector 12
610 Aligning the first image capturing unit 13
620 Method of first image capturing unit 13
700 Merging charging connector 12 and charging connector socket 21
710a Repeated optical capturing during merging 700
710b Repeated capturing of the distance during the merging 700
720a in each case comparing the currently captured image with the previously captured image
720b in each case comparing the currently captured distance with the previously captured distance
800a Repeated optical capturing in the merged state
800b Repeated detection of the distance in the merged state
800c Optical capturing in the merged state
900a n each case comparing the currently captured image with the previously captured image
900b in each case comparing the currently captured distance with the previously captured distance
900c Comparing another picture with a second picture or with a third picture

The invention claimed is:

1. A method for automatically connecting a charging connector to a charging connector socket of a vehicle, the method comprising:
first optical capturing of the charging connector socket and/or the vehicle as a first image with at least one first image capturing unit movable with the charging connector,
determining the position of the charging connector socket and/or of the vehicle based on the first image,
reducing the distance between the charging connector and the charging connector socket and/or the vehicle using a positioning unit, and
second optical capturing of the charging connector socket and/or of the vehicle as a second image with the at least one first image capturing unit while the at least one first image capturing unit is stationary.

2. The method according to claim 1, wherein
the first optical capturing of the charging connector socket and/or the vehicle takes place at an initial distance between the charging connector and the charging connector socket and/or the vehicle.

3. The method according to claim 1, further comprising:
determining the position of the charging connector socket and/or of the vehicle based on the second image,
further reducing the distance between the charging connector and the charging connector socket and/or the vehicle using the positioning unit, and
third optical capturing of the charging connector socket and/or of the vehicle as a third image with the at least one first image capturing unit.

4. The method according to claim 3, wherein
the first, the second, and/or the third optical capturing is preceded and/or followed by a change in the position and/or the orientation of the at least one first image capturing unit with respect to the charging connector socket and/or the vehicle using the positioning unit.

5. The method according to claim 3 further comprising:
determining the position and the orientation of the charging connector socket based on the second image or based on the third image.

6. The method according to claim 3 wherein
the distance of the charging connector to the charging connector socket and/or to the vehicle is captured by at least one distance sensor movable with the charging connector,
wherein determining the position and/or the orientation of the charging connector socket and/or the vehicle in the first, second, and/or third image takes into account the distance captured by the at least one distance sensor.

7. The method according to claim 3, wherein
determining the position and/or the orientation of the charging connector socket and/or the vehicle in the first, second, and/or third image takes into account a previous change in position and/or change in orientation of the positioning unit.

8. The method according to claim 1, wherein at least one optical capturing of the charging connector socket and/or of the vehicle takes place with illumination of the charging connector socket and/or the vehicle by at least one lighting unit movable with the charging connector.

9. The method according to claim 1, further comprising:
aligning the charging connector with respect to the charging connector socket using the positioning unit, and
merging the charging connector and the charging connector socket using the positioning unit.

10. The method according to claim 9, wherein
aligning the charging connector with respect to the charging connector socket comprises:
aligning the at least one first image capturing unit with respect to the charging connector socket, and
moving the at least one first image capturing unit, at height, away from the charging connector socket so that the charging connector is positioned and/or oriented in front of the charging connector socket.

11. The method according to claim 9, wherein
merging of the charging connector and the charging connector socket comprises a linear movement of the charging connector through
an actuated linear axis of the positioning unit.

12. The method according to claim 1, further comprising:
repeated optical capturing of the charging connector, the charging connector socket, and/or the vehicle with the at least one first image capturing unit during the merging of the charging connector and the charging connector socket, and in each case comparing a currently captured image with a previously captured image, and/or repeated detecting of the distance between the charging connector and the charging connector socket and/or the vehicle with at least one distance sensor movable with the charging connector during the merging of the charging connector and the charging connector socket, and in each case comparing the currently captured distance with a previously captured distance.

13. The method according to claim 1, further comprising:
repeatedly capturing further images of the charging connector, the charging connector socket, and/or the vehicle in a merged state using at least one first image recording unit, and repeatedly comparing the further images to one another to detect changes between the further images, and/or repeatedly detecting distances between the charging connector and the charging connector socket or the vehicle in the merged state using at least one distance sensor movable with the charging connector, and repeatedly comparing the distances to one another to detect changes between the distances.

14. The method according to claim 1, further comprising:
capturing a further image of the charging connector, the charging connector socket, and/or the vehicle in a merged state using the at least one first image capturing unit, and comparing the further image with the second or third image.

15. The method according to claim 1, wherein
surroundings of the positioning unit or the charging connectors are at least temporarily monitored using the at least one first image capturing unit and/or at least one distance sensor attached to and movable with the charging connector.

16. The method according to claim 1, wherein
at least one optical image of a working space of the positioning unit is captured by at least one second image capturing unit, and wherein the working space is monitored and the charging connector is prepositioned based on the at least one optical image of the working space.

17. A device for automatically connecting a charging connector to a charging connector socket of a vehicle, the device comprising:
at least one positioning unit capable of positioning the charging connector;
at least one first image capturing unit capable of moving with the charging connector and capable of optically capturing at least the charging connector socket of the vehicle; and
at least one control unit which is designed to carry out a method comprising the steps of
first optical capturing of the charging connector socket and/or the vehicle as a first image with at least one first image capturing unit movable with the charging connector, determining the position of the charging connector socket and/or of the vehicle based on the first image, reducing the distance between the charging connector and the charging connector socket and/or the vehicle using a positioning unit, and second optical capturing of the charging connector socket and/or of the vehicle as a second image with the at least one first image capturing unit while the at least one first image capturing unit is stationary.

18. A computer program product with a program code, which is stored on a non-transitory medium readable by a computer, for carrying out a method for automatically connecting a charging connector to a charging connector socket of a vehicle, wherein the method comprises
first optical capturing of the charging connector socket and/or the vehicle as a first image with at least one first image capturing unit movable with the charging connector, determining the position of the charging connector socket and/or of the vehicle based on the first image, reducing the distance between the charging connector and the charging connector socket and/or the vehicle using a positioning unit, and second optical capturing of the charging connector socket and/or of the vehicle as a second image with the at least one first image capturing unit while the at least one first image capturing unit is stationary.

19. A method for automatically connecting a charging connector to a charging connector socket of a vehicle, the method comprising the steps of:
capturing with at least one image capturing unit a first image of the charging connector socket or the vehicle;
determining a position of the charging connector socket or of the vehicle based on the first image;
reducing a distance between the charging connector and the charging connector socket or the vehicle using a positioning unit; and
capturing with the at least one image capturing unit a second image of the charging connector socket or the vehicle;
determining the position of the charging connector socket or of the vehicle based on the second image;
further reducing the distance between the charging connector and the charging connector socket or the vehicle using the positioning unit; and
capturing with the at least one image capturing unit a third image of the charging connector socket or the vehicle,
wherein the at least one image capturing unit is attached to and movable with the charging connector,
wherein the distance between the charging connector and the charging connector socket or the vehicle is measured by at least one distance sensor attached to and movable with the charging connector, and
wherein the position of the charging connector socket or the vehicle in the first image, the second image, or the third image is determined taking into account the distance measured by the at least one distance sensor.

* * * * *